US007207233B2

(12) United States Patent
Wadge

(10) Patent No.: US 7,207,233 B2
(45) Date of Patent: Apr. 24, 2007

(54) MECHANISM FOR USE IN A POWER TOOL AND A POWER TOOL INCLUDING SUCH A MECHANISM

(75) Inventor: Brian Wadge, Durham (GB)

(73) Assignee: Black & Decker Inc., Newark, DE (US)

( * ) Notice: Subject to any disclaimer, the term of this patent is extended or adjusted under 35 U.S.C. 154(b) by 880 days.

(21) Appl. No.: 10/316,455

(22) Filed: Dec. 11, 2002

(65) Prior Publication Data

US 2006/0123941 A1 Jun. 15, 2006

(30) Foreign Application Priority Data

Dec. 13, 2001 (GB) .................................. 129755.5

(51) Int. Cl.
*F16H 1/02* (2006.01)

(52) U.S. Cl. .................................. 74/412 R; 81/57.26

(58) Field of Classification Search .............. 74/412 R, 74/416, 417; 81/57.26, 57.28

See application file for complete search history.

(56) References Cited

U.S. PATENT DOCUMENTS

| | | | | |
|---|---|---|---|---|
| 2,106,937 | A | | 2/1938 | Torbert, Jr. et al. |
| 2,348,266 | A | | 5/1944 | Selby et al. |
| 2,546,655 | A | * | 3/1951 | Shaler ........................ 173/216 |
| 2,791,142 | A | * | 5/1957 | Lyon ......................... 81/57.26 |
| 3,456,458 | A | * | 7/1969 | Dixon ........................ 464/109 |
| RE32,415 | E | * | 5/1987 | Grech ........................ 464/109 |
| 5,533,581 | A | | 7/1996 | Barth et al. |
| 5,784,934 | A | * | 7/1998 | Izumisawa ................. 81/57.26 |
| 7,055,622 | B2 | * | 6/2006 | Bone .......................... 173/217 |
| 2004/0084195 | A1 | * | 5/2004 | Ullah ......................... 173/216 |
| 2006/0123941 | A1 | * | 6/2006 | Wadge ........................ 74/395 |

FOREIGN PATENT DOCUMENTS

| | | |
|---|---|---|
| GB | 1 462 063 | 1/1977 |
| GB | 2 118 076 A | 10/1983 |
| GB | 2 167 327 A | 5/1986 |
| GB | 2 303 568 A | 2/1997 |

* cited by examiner

*Primary Examiner*—David M. Fenstermacher
(74) *Attorney, Agent, or Firm*—Bruce S. Shapiro; John Yun; Wesley W. Muller

(57) ABSTRACT

A mechanism comprises an input shaft (11) and an output shaft (32) which are co-planar. Between the input shaft and output shaft is an axis (20) orthogonal to both shafts about which mounting brackets (30) holding the input and output shafts may pivot. This permits an angular adjustment between the input and output shaft within the same plane.

12 Claims, 10 Drawing Sheets

MECHANISM FOR USE IN A POWER TOOL AND A POWER TOOL INCLUDING SUCH A MECHANISM

The present invention relates to a mechanism for use in a power tool, which mechanism comprises an input shaft rotatable about a first axis and an output shaft rotatable about a second axis.

Such a mechanism is known, for example, from DE 41 163 43 A1 in which an electric drill/driver is disclosed. The drill/driver has a housing for an electric motor, the rotational output of which first passes through a gearbox and then engages with a bevel gear arrangement. The purpose of the bevel gear arrangement is to serve as a locus about which an output shaft of the drill/driver may revolve yet continue to be in engagement therewith. In this manner, the output shaft of the drill/driver may be rotated about the bevel gear to adjust the angle between the input shaft and the output shaft.

One shortcoming of the above type of mechanism, however, is that bevel gears are expensive to manufacture and they take up a relatively large amount of space within a drill/driver because the other cogs needed to co-operate therewith need to be angularly off-set relative thereto in order to function. Furthermore, there is a need for great alignment and accuracy between the cogs that make up the gears in order to achieve proper functioning of the resultant drill/driver.

One object of the present invention, therefore, is to provide a mechanism similar to that known from the prior art, but which does not suffer to that known from the prior art, but which does not suffer the drawbacks associated with use of bevel gears.

In addition, it has been found that that need to permit adjustment of the angle between input shaft and output shaft can be achieved with both shafts remaining in the same plane after adjustment lends itself to avoiding the use of bevel gears. In DE 41 16 343, for example, adjustment of the output shaft relative to the input shaft occurs such that the two shafts no longer lie in the same (or parallel) planes following adjustment. To have the two shafts always in the same or parallel planes will often be considered advantageous by a workman so that re-orientation of a tool in use is avoided.

It is thus one object of the present invention to provide a mechanism as set out in the opening paragraph above, characterised in that the first axis and the second axis lie in the same plane or in parallel planes, yet the relative orientation of the first axis to the second axis is adjustable within the said same plane or parallel planes; the mechanism arranged to transmit rotational drive from the input shaft to the output shaft regardless of the orientation of the first axis relative to the second axis, the mechanism including a faceplate gear arranged between the input shaft and the output shaft; the faceplate gear co-operable with the input shaft and the output shaft thereby to transmit rotary drive from the input shaft to the output shaft; and the faceplate gear arranged to lie in a plane which is parallel with the plane in which the first axis and the second axis lie; and wherein either or both of the input shaft and the output shaft are moveable about the faceplate gear to allow adjustment of the relative orientation of the first axis and the second axis.

Preferably the faceplate gear is rotatable about a third axis, which third axis is orthogonal to the first and second axes. This provides for the facility for the mechanism to be compact in use and to allow for in-line use of the mechanism when there is no angular displacement between the first and second axes. Preferably, the faceplate gear is freely rotatable about the third axis.

In a preferred embodiment the input shaft and the output shaft may have pinions formed thereon, each pinion for co-operation with teeth formed on the faceplate gear. Furthermore, the faceplate gear itself may be disc-like having two major faces thereof and wherein only one major face of the faceplate gear carries teeth.

Preferably the input shaft and the output shaft are each hinged for adjustment about a common pivot. The common pivot may be formed on the third axis.

According to a first aspect of the present invention, there is provided a power tool including a mechanism as recited above.

One embodiment of the present invention will now be described, by way of example only, and with reference to the accompanying drawings of which:

FIG. 1 shows a plan view of a mechanism for use in the power tool in accordance with the first aspect of the present invention;

FIG. 2 also shows a plan view of a mechanism in accordance with the present invention but the device of FIG. 1 has been rotated by 90° about the axis x—x thereof;

Figure 1:
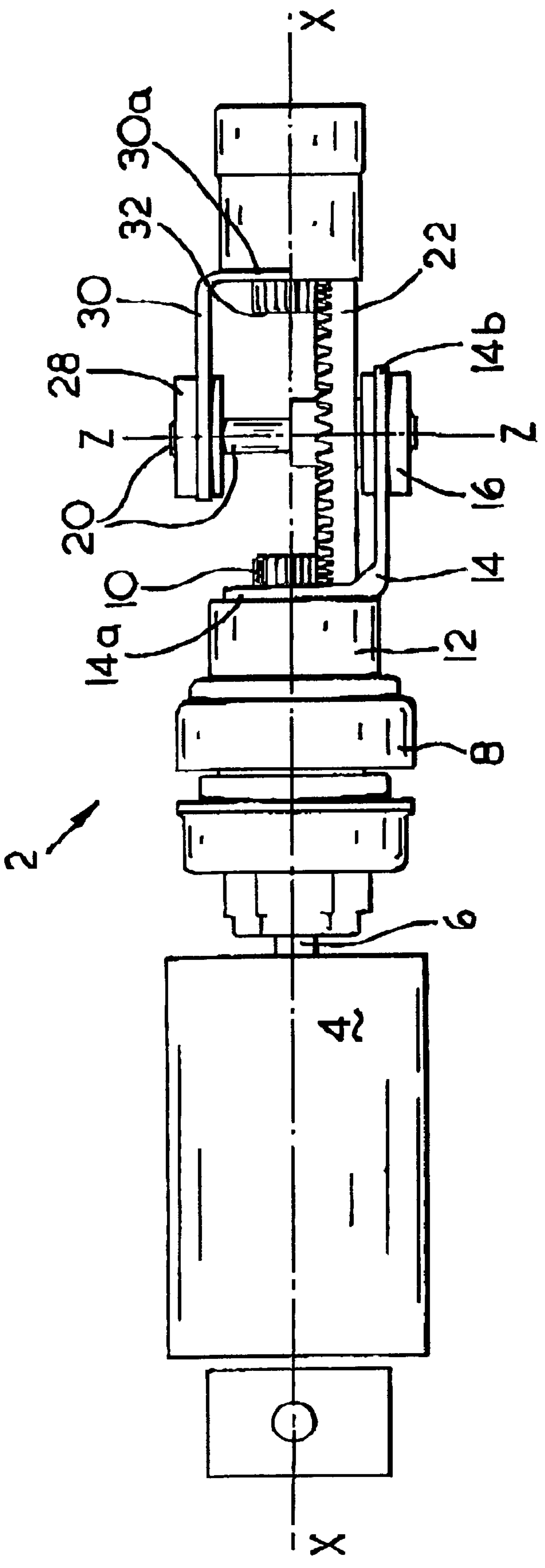

Referring firstly to FIG. 1, there is shown generally at (2) a mechanism for use in a power tool. Within the power tool there is also included a motor (4) in this case an electric motor which provides rotational output via drive shaft (6) to a gear mechanism shown generally at (8).

As is known in the art a user will energise the motor (4) to the desired amount in order to cause rotation of the drive shaft (6). Because electric motors tend to rotate at very high speeds compared to the speed needed by the implement at the very output end of the tool, then it is usual for a gear mechanism such as that shown at (8) to be employed in order to reduce the output speed at the working end of the mechanism or tool. In this example, although not shown but known in the art, the gear mechanism (8) is an epicyclic gear arrangement which will provide, selectively, a reduction of 3:1 between input and output speed. Those skilled in the art will appreciate that the gear reduction mechanism does not need to be as shown in the drawings. For example, a gearbox may be placed either before, after or split both before and after the faceplate gear.

The output of the gear mechanism (8), in this example, is a first pinion (10) formed on an input shaft (11) (shown in FIG. 7) for the mechanism (2). The input shaft (11) for the first pinion (10) could, in fact, be the pinion (10) itself but in this example, the pinion (10) is press fitted over the input shaft (11) upon which it is mounted and so cannot be seen as a separate element in the drawings, other than FIG. 7. Those skilled in the art will appreciate that the choice of whether the pinion (10) is formed on, or in addition to, the input shaft on which it is mounted, or whether the pinion (10) is integrally formed itself as part of the input shaft is a matter of design choice.

Mounted on the output spigot (12) of the gear mechanism (8) is a support bracket (14). The bracket (14) is generally L-shaped with a first arm (14*a*) flush with the external surface of the output spigot (12) and mounted thereon in between the output spigot (12) and the first pinion (10). The support bracket (14) is rigidly mounted to the output spigot (12). It will be understood that the input shaft upon which the first pinion (10) is mounted is free to rotate within a suitable hole or channel formed within the arm (14*a*) of support bracket (14).

Figure 7:
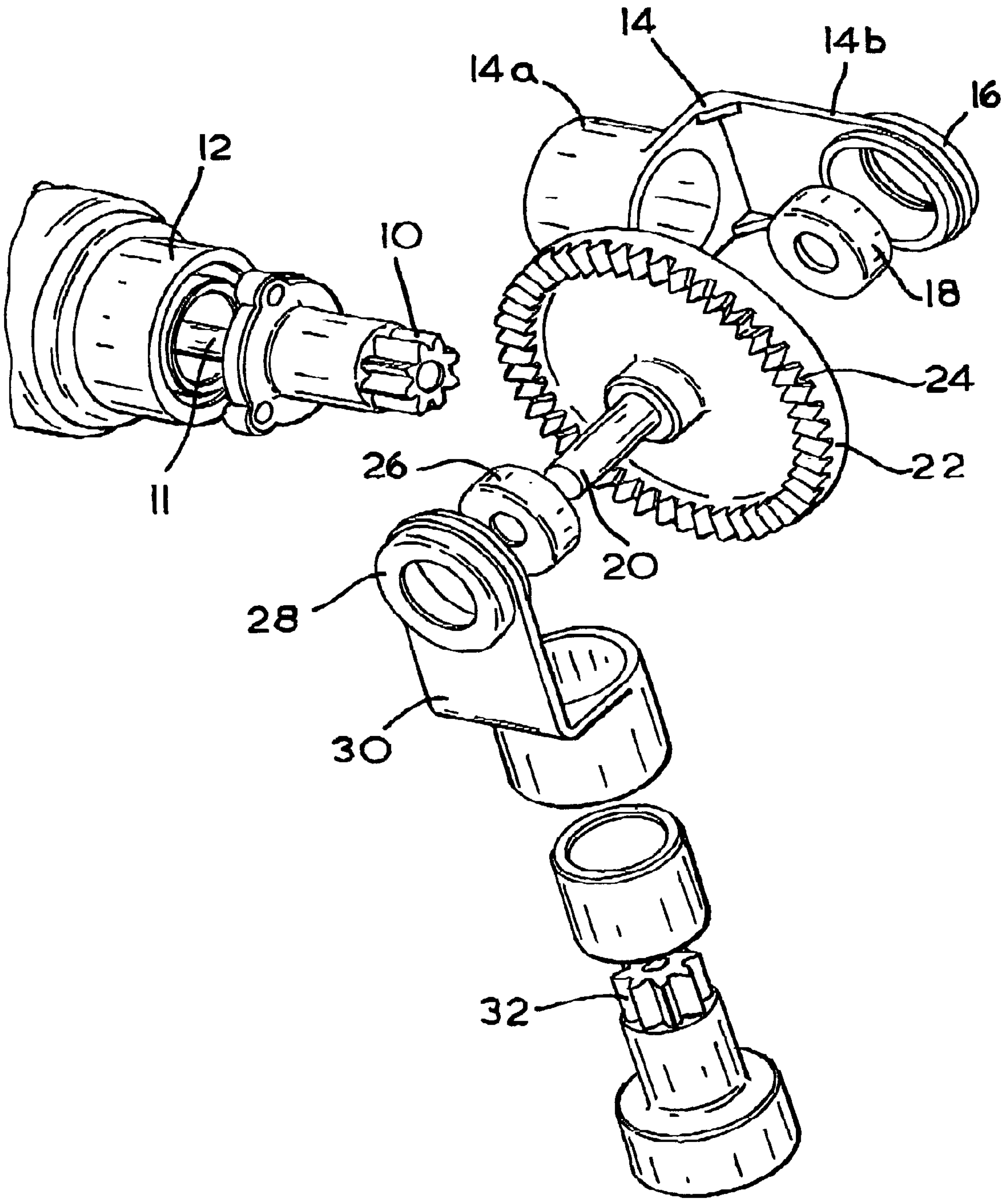
FIG. 7 shows an exploded perspective view of the mechanism of FIGS. 5 and 6.

As can be seen most readily now also from FIG. 7, the support bracket (14) includes on its arm (14*b*) a circular boss (16) shaped to receive a first trunnion (18). Into the trunnion is fitted an axle (20) which supports a faceplate gear (22). In the example shown the faceplate gear (22) has teeth (24) formed on only one major surface thereof. Those skilled in the art will appreciate, however, that the teeth (24) could be formed on the other major face of the faceplate gear (22) or, in fact, both major faces of the faceplate gear (22).

The remote end of the axle (20) is fitted within a second trunnion (26) which itself fits within a further boss (28) formed on a further support bracket (30). It will be seen that the support bracket (14) and the further support bracket (30) are of similar construction. The end (30*a*) of the further support bracket (30) supports an output shaft of the mechanism onto which (or, again, integral with which—as in the case in this example) is a second pinion (32). Again, if the pinion (32) is formed separately from the output shaft then it is press fitted or coupled thereto in such a way that the portion (30*a*) of further support bracket (30) has a hole or recess formed therein to allow rotation of the shaft therein such that the pinion (32) and the further shaft rotate as a single unit. However, in the present example where the second pinion (32) is formed integrally with the output shaft then, of course, rotation of the second pinion (32) will cause concomitant rotation of its output shaft.

The axle (20) serves as a pivot point about which the support brackets (14) and (30) may pivot. It will be understood, however, that as the support bracket (14) is rigidly coupled to the gearbox (12) of the mechanism (2) then, effectively, the only pivoting which occurs is that of the further support bracket (30) about the axle (20). The first (18) and second (26) trunnions captivate the axle (20) at its remote ends but permit relative rotation and movement between that trunnion (18, 20) and its respective boss (16, 28).

The faceplate gear (22) is able to freely rotate about the axle (20). As an alternative the faceplate gear (22) may be rigidly coupled to the axle (20) but the axle (20) itself may rotate within its respective trunnions (18, 26). In either situation, the effective result is that the faceplate gear (22) is freely rotatable about its mounting axis and the alignment of the first pinion (10) relative to the second pinion (32) may be varied by virtue of pivoting being possible about the axle (20).

The above will be better understood by reference now to all of the drawings which show that the input shaft upon which the first pinion (10) is mounted always lies in the same plane as the second pinion (32) and the output shaft upon which that is mounted.

Although pivoting of the second pinion (32) relative to the first pinion (10) may occur, it will be understood that such pivoting will always occur such that the pinions (10), (32) are in the same plane or in parallel planes.

Figure 2:
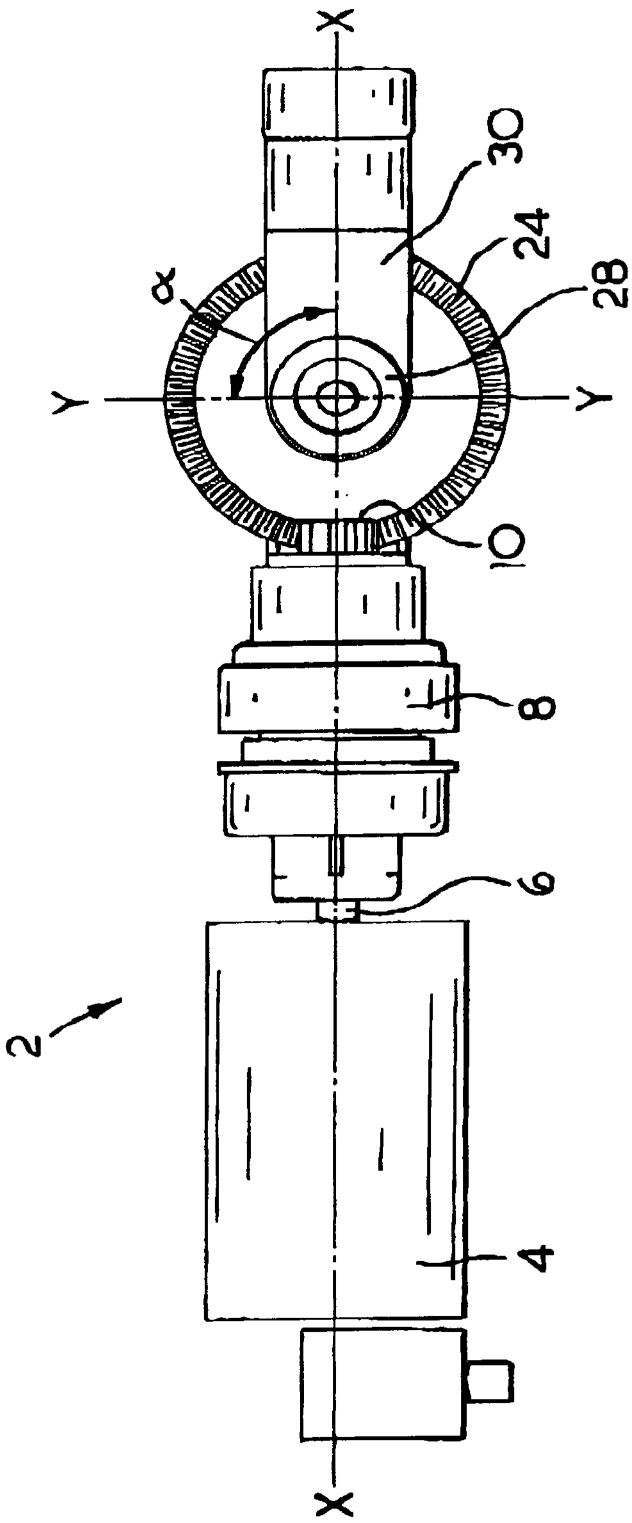
Figure 3:
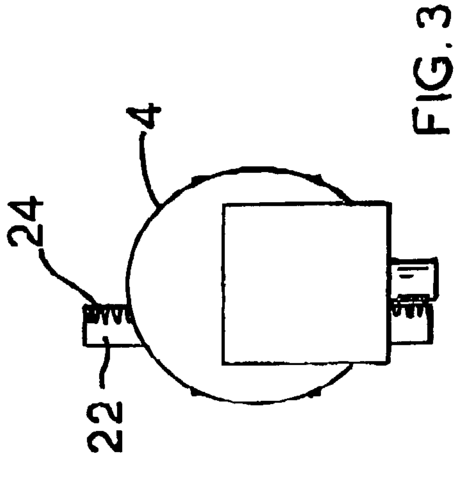
FIG. 3 shows an end view of the view of FIG. 2 taken from the left-hand side thereof.

It can be seen from particularly FIGS. 1 and 2 that the first pinion (10) and its input shaft rotate about a first axis (shown along the line X—X of these figures). It will also be seen that the second pinion (32) and its output shaft rotate about a second axis. In the example shown in FIGS. 1 and 2 the second axis also happens to be along the same line X—X as shown in the figure. However, it will be appreciated that as the faceplate gear (22) is mounted upon the axle (20) and that therefore the axle (20) lies along a third axis Z—Z as shown in FIG. 1, the angular orientation between the first and second axes may be varied about the third axis. This is shown most clearly in FIG. 2 wherein the angle ($\alpha$) is shown between the axis X—X and the orthogonal axis Y—Y.

In this way the relative orientation of the first axis to the second axis is adjustable but always within the same plane, that is the first and second axes always remain either coplanar or within parallel planes.

The working of the mechanism shown generally as 2 will now be described. Energising of the motor, as has already been stated, results in a rotational drive (6) inputting to the gear mechanism (8) which is coupled to the input shaft to which the first pinion (10) is mounted. Rotation of the pinion (10) causes concomitant rotation of the faceplate gear (22) as will be known by those skilled in the art. Because the faceplate gear (22) is rotationally mounted about axle (20) and the third axis Z—Z, yet is operatively coupled to the gearbox (12) via support bracket (14), then rotation of the faceplate gear occurs about an axis that is orthogonal to the axis about which the first pinion (10) rotates.

It will also be seen that the plane in which the input shaft and the output shaft are oriented is parallel with the plane in which the faceplate gear (22) lies. This is the situation regardless of the angular orientation between the input and output shafts.

It will also be understood that pivoting of the output shaft and second pinion (32) about the axle (20) (or third axis) is possible without affecting the operation of the mechanism. The purpose of the mechanism is to transmit drive between the input shaft and its respective pinion (10) and the output shaft and its respective pinion (32). This will be achieved regardless of the angle or orientation between the input and output shaft.

It can be seen that the faceplate gear (22) comprises two major surfaces, one of which carries the teeth (24). The faceplate gear (22) is therefore disc-like in shape.

Figure 4:
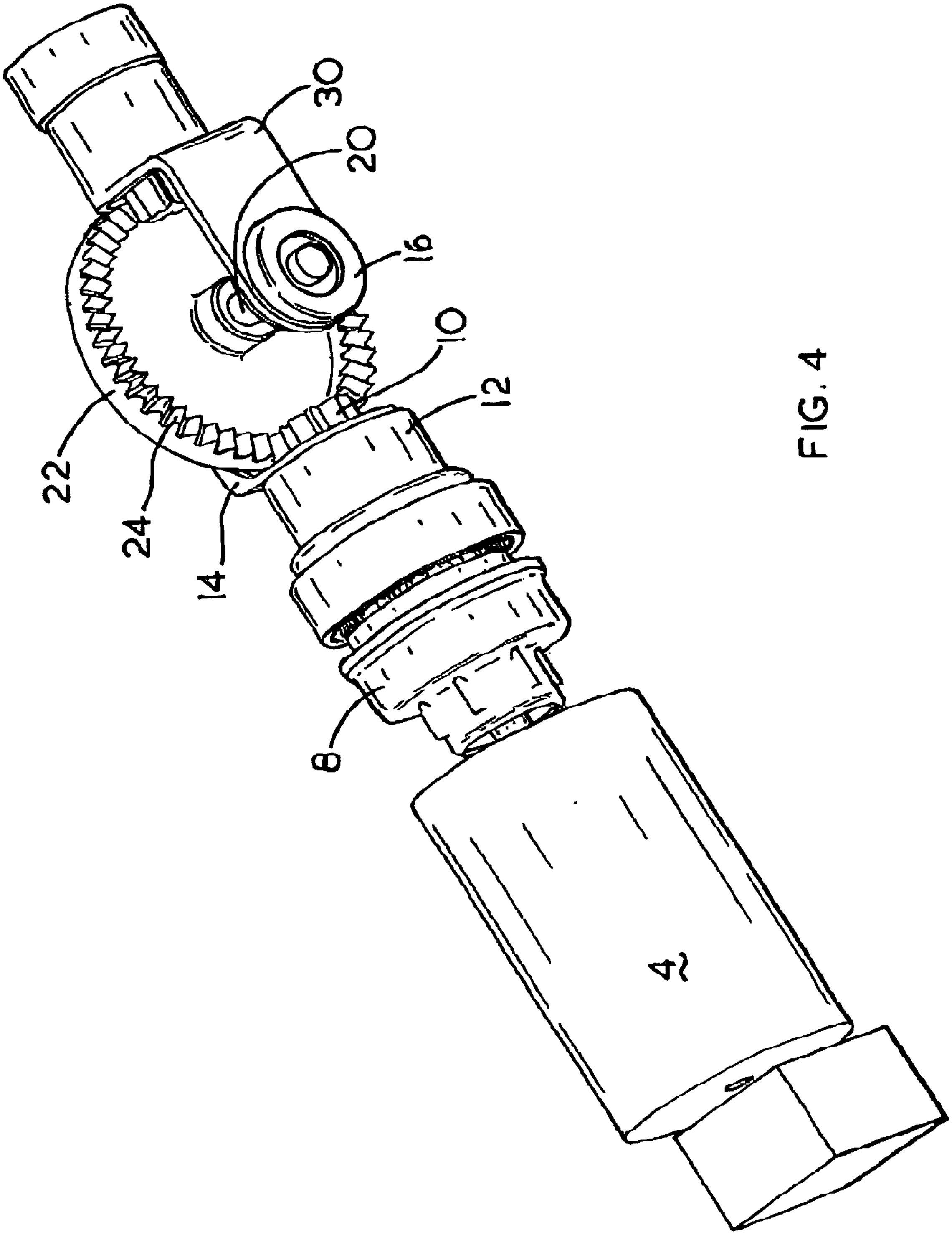
FIG. 4 shows a perspective view of the mechanism of FIGS. 1–3 wherein the input shaft and output shaft are in-line.
Figure 5:
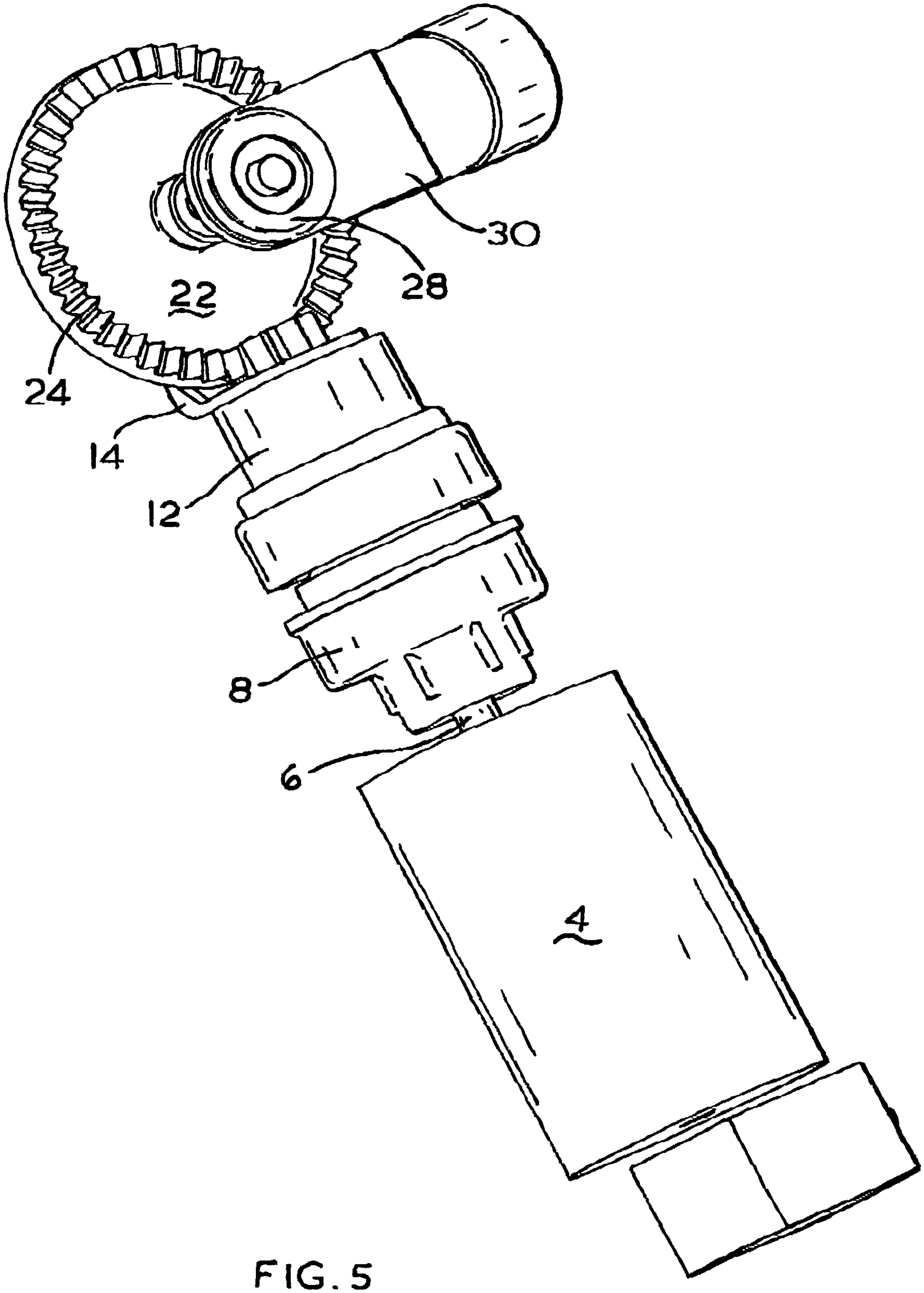
FIG. 5 shows a perspective view of the mechanism of FIG. 4 but with the output shaft having been rotated through 90° relative to the input shaft.
Figure 6:
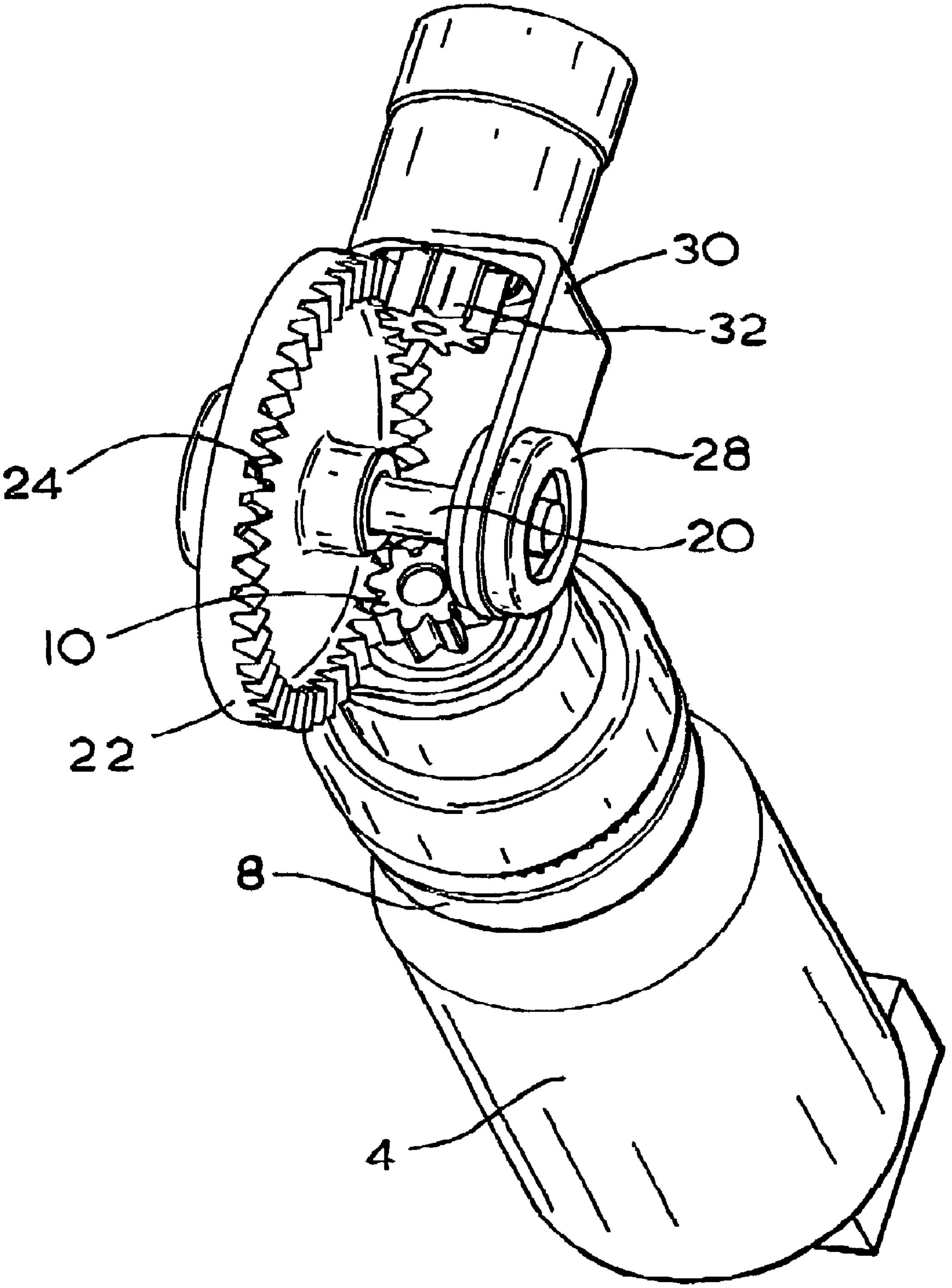
FIG. 6 shows a perspective view of the mechanism of FIG. 5 but taken from a different angle in order to illustrate more clearly the interaction between the input and output shafts and the faceplate gear.

Reference particularly to FIGS. 5, 6 and 7 show how (by comparison with FIG. 4) the angle ($\alpha$) of the output shaft may be varied relative to the input shaft in order to allow rotational output at an angle other than in-line with the input shaft and its first pinion (10). Such situation may be useful, for example, when the mechanism is employed in a drill/driver as shown in FIGS. 8–11. In these figures it can be seen that the drill/driver (30) comprises a main body housing (32) and a pivotable head (34). It can be seen that the head (34) has (in FIGS. 9 and 11) been pivoted through 90° with respect to the position of the head (34) in FIGS. 8 and 10.

It will be apparent that the angle ($\alpha$) is able to be varied in either sense, that is clockwise or anticlockwise viewing FIG. 2 and this is another advantageous versatile aspect of the present invention.

In FIGS. 8–11 an actuator button (36) is depressed by a user in order to actuate the drill/driver (30) as is known. An output chuck or collet (38) is fixed to the end of the output shaft in order to accept a drill or screwdriver bit, again, in known manner.

Figure 8:
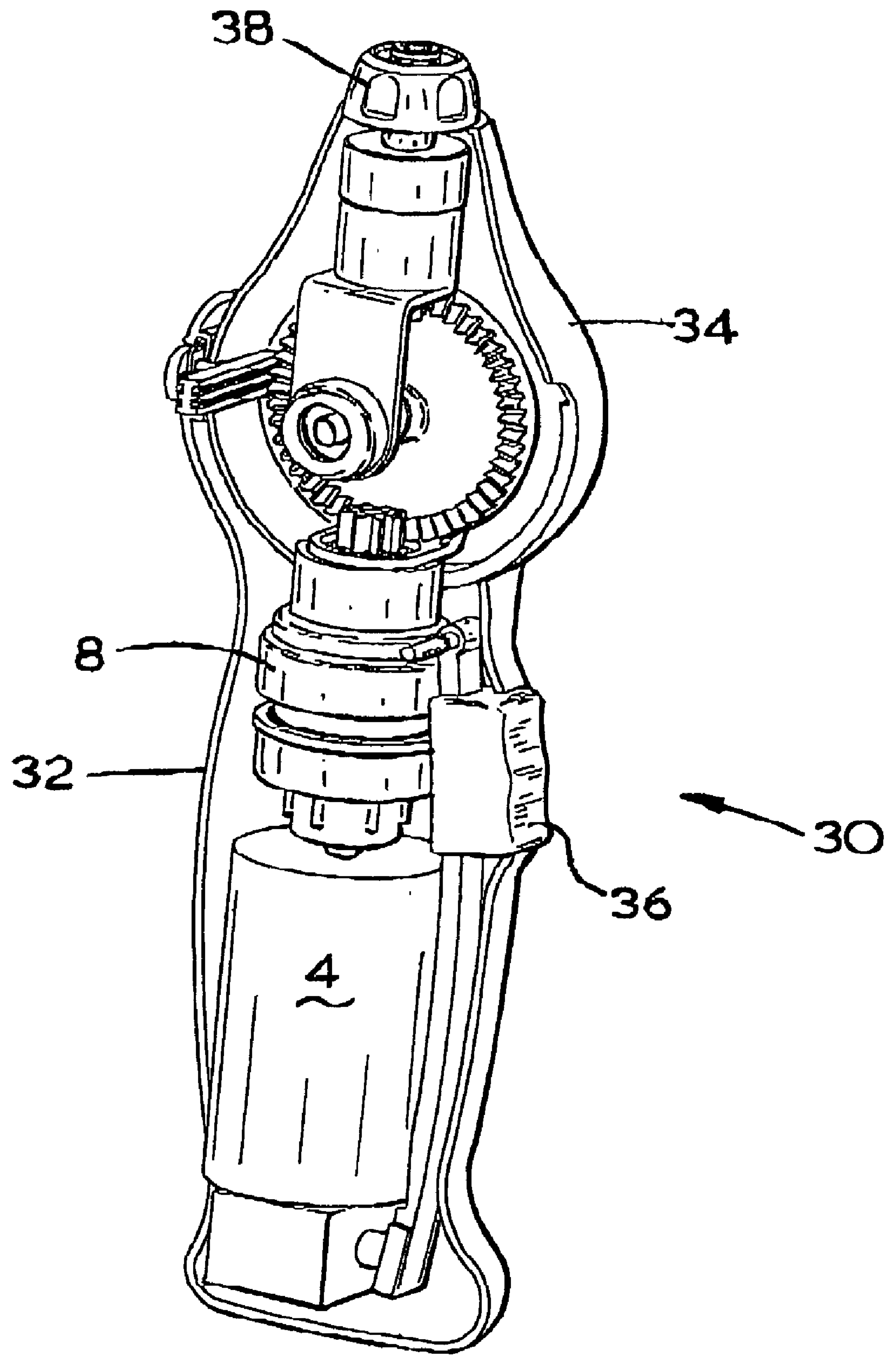
FIG. 8 shows a schematic view of a power tool including a mechanism as shown in FIGS. 1–7.
Figure 9:
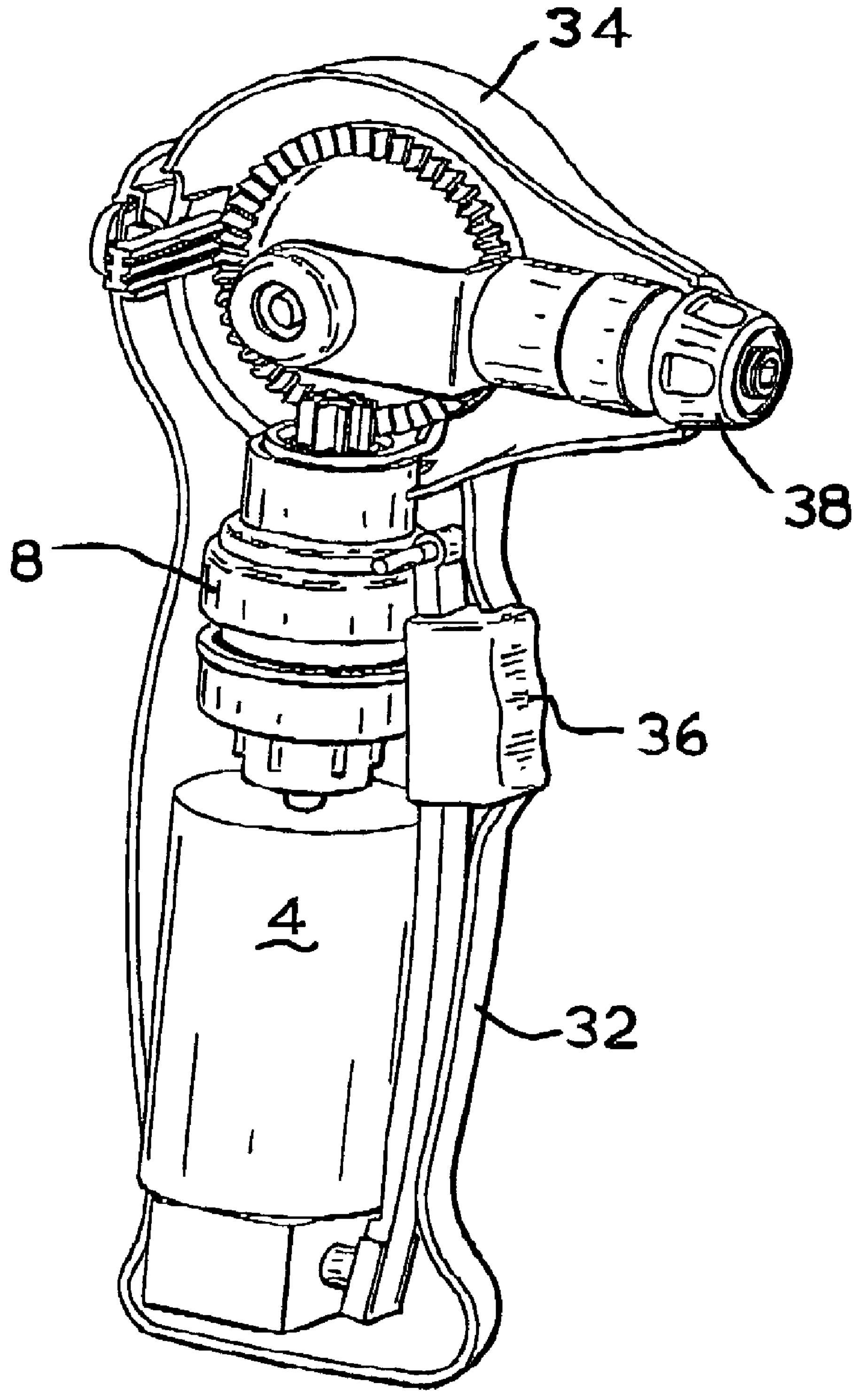
FIG. 9 shows a similar view to that of FIG. 8, but with the output rotated by 90° with respect to the input.
Figure 10:
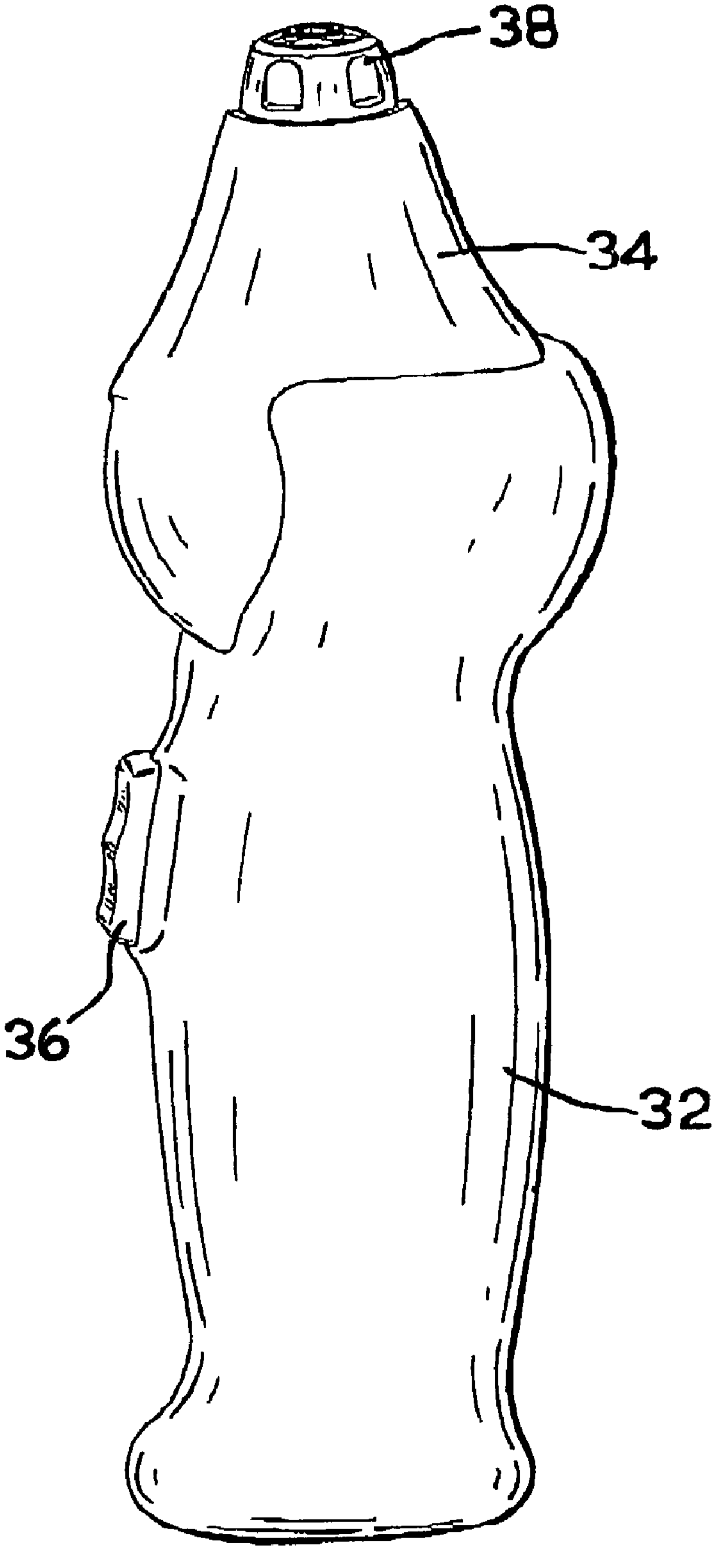
FIG. 10 shows a view from the other side of the power tool from that of FIG. 8.
Figure 11:
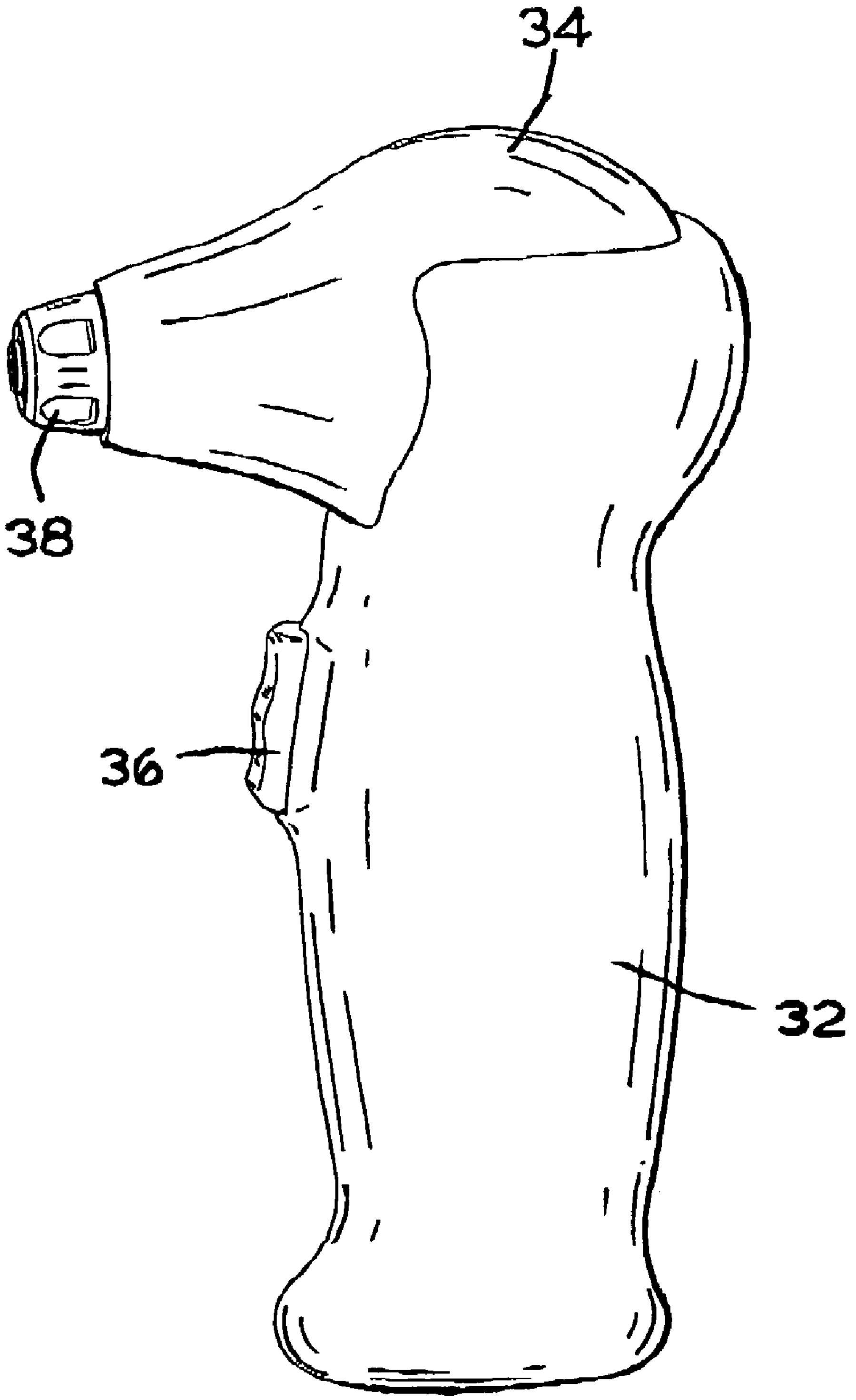
FIG. 11 shows a view from the other side of the power tool from that of FIG. 9

Those skilled in the art will appreciate that the faceplate gear (22) may have teeth formed on one or both sides thereof. Such situations may occur when accessed to an area to which the drill/driver is to be applied is limited and so an adjustment of the shape of the tool is advantageous. It can be seen that there is no difference per se in the final output of the mechanism by virtue of varying the angle of orientation between the input shaft and output shaft, only the angle at which the rotary output is taken. In use of a power tool including such a mechanism in FIG. 2 as shown in FIG. 8 any suitable final output such as a chuck or collet (38) for carrying a drill bit, etc will suffice.

The invention claimed is:

1. A mechanism for use in a power tool, which mechanism comprises, an input shaft rotatable about a first axis and an output shaft rotatable about a second axis, the input and output shafts being at least partially positioned within a housing, the output shaft having one end extending through the housing, wherein the first axis and the second axis lie in the same plane, yet the relative orientation of the first axis to the second axis is adjustable within the said same plane; the mechanism arranged to transmit rotational drive from the input shaft to the output shaft regardless of the orientation of the first axis relative to the second axis, the mechanism including a faceplate gear arranged between the input shaft and the output shaft; the faceplate gear co-operable with the input shaft and the output shaft thereby to transmit rotary drive from the input shaft to the output shaft; and the faceplate gear arranged to lie in a plane which is parallel with the plane in which the first axis and the second axis lie; and wherein one of the input shaft and the output shaft is moveable about the faceplate gear to allow adjustment of the relative orientation of the first axis and the second axis.

2. A mechanism according to claim 1, wherein the faceplate gear is rotatable about a third axis, which third axis is orthogonal to the first and second axes.

3. A mechanism according to claim 2, wherein the faceplate gear is freely rotatable about the third axis.

4. A mechanism according to claim 1, wherein both the input shaft and the output shaft have pinions formed thereon, each pinion for co-operation with teeth formed on the faceplate gear.

5. A mechanism according to claim 1, wherein the faceplate gear has two major faces thereof and wherein only one major face of the faceplate carries teeth.

6. A mechanism according to claim 2, wherein the input shaft and the output shaft are each hinged for adjustment about a common pivot.

7. A mechanism according to claim 6, wherein the common pivot is formed on the third axis.

8. A mechanism for use in a power tool, which mechanism comprises:

an input shaft rotatable about a first axis;

an output shaft rotatable about a second axis, wherein the first axis and the second axis lie in the same plane, yet the relative orientation of the first axis to the second axis is adjustable within the same plane, the mechanism being arranged to transmit rotational drive from the input shaft to the output shaft regardless of the orientation of the first axis relative to the second axis;

a faceplate gear arranged between the input shaft and the output shaft, the faceplate gear being co-operable with the input shaft and the output shaft thereby to transmit rotary drive from the input shaft to the output shaft, wherein the faceplate gear is fixed for rotation with a faceplate gear shaft;

a first bracket rotatably supporting a first end of the faceplate gear shaft; and a second bracket rotatably supporting a second end of the faceplate gear shaft, wherein the first and second brackets are separate and spaced apart from one another.

9. A mechanism according to claim 8, wherein the first bracket rotatably supports the input shaft and wherein the second bracket rotatably supports the output shaft.

10. A mechanism according to claim 9, wherein the first bracket includes a substantially hollow cylindrical portion circumscribing at least part of the first shaft and an arm portion axially extending substantially parallel to the first axis.

11. A mechanism according to claim 10, wherein the arm portion of the first bracket includes a circular boss shaped to receive a trunnion rotatably supporting the faceplate gear shaft.

12. A mechanism according to claim 8, wherein the faceplate gear shaft rotates about a third axis perpendicular to the first and second axes.

* * * * *